UNITED STATES PATENT OFFICE.

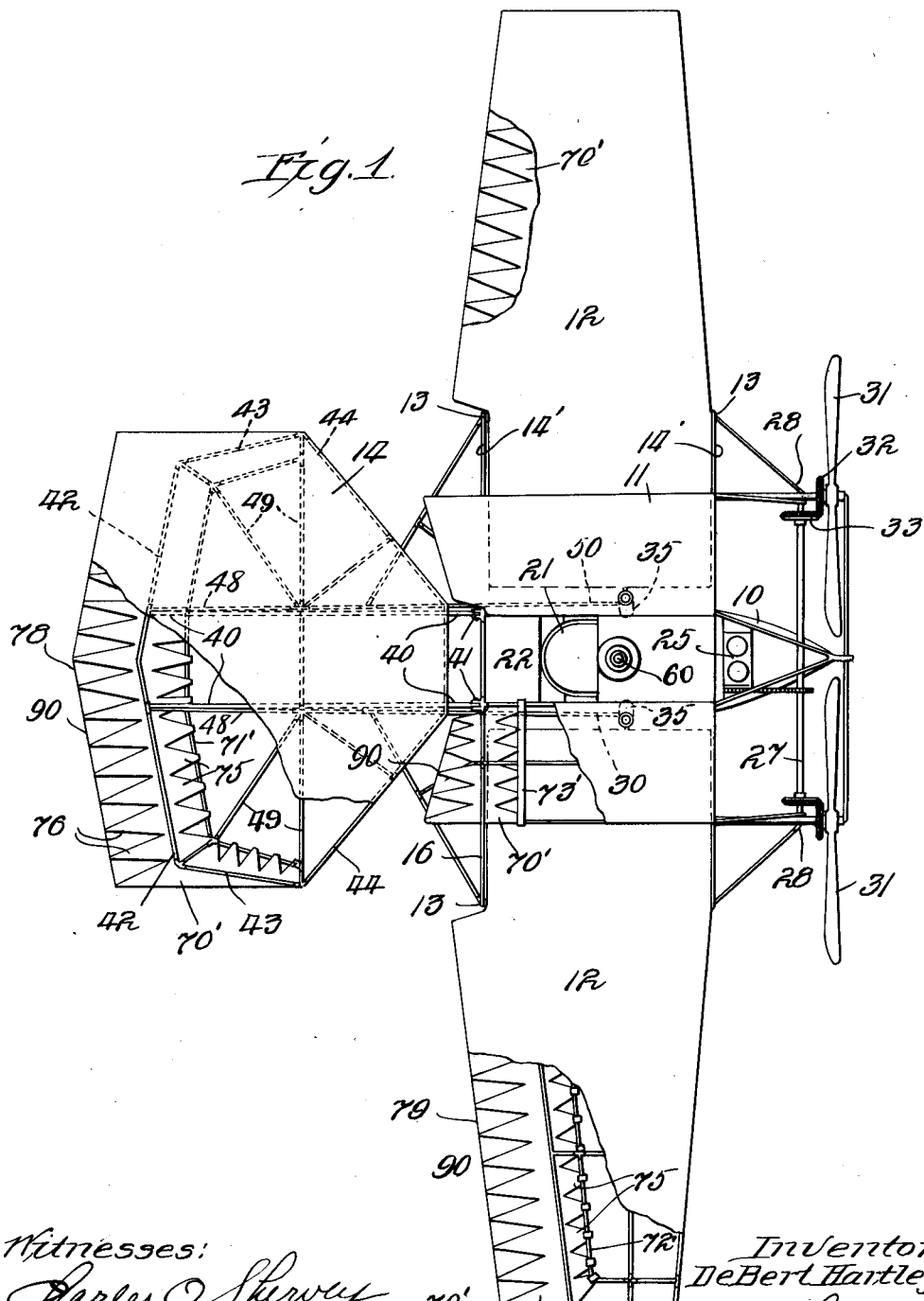

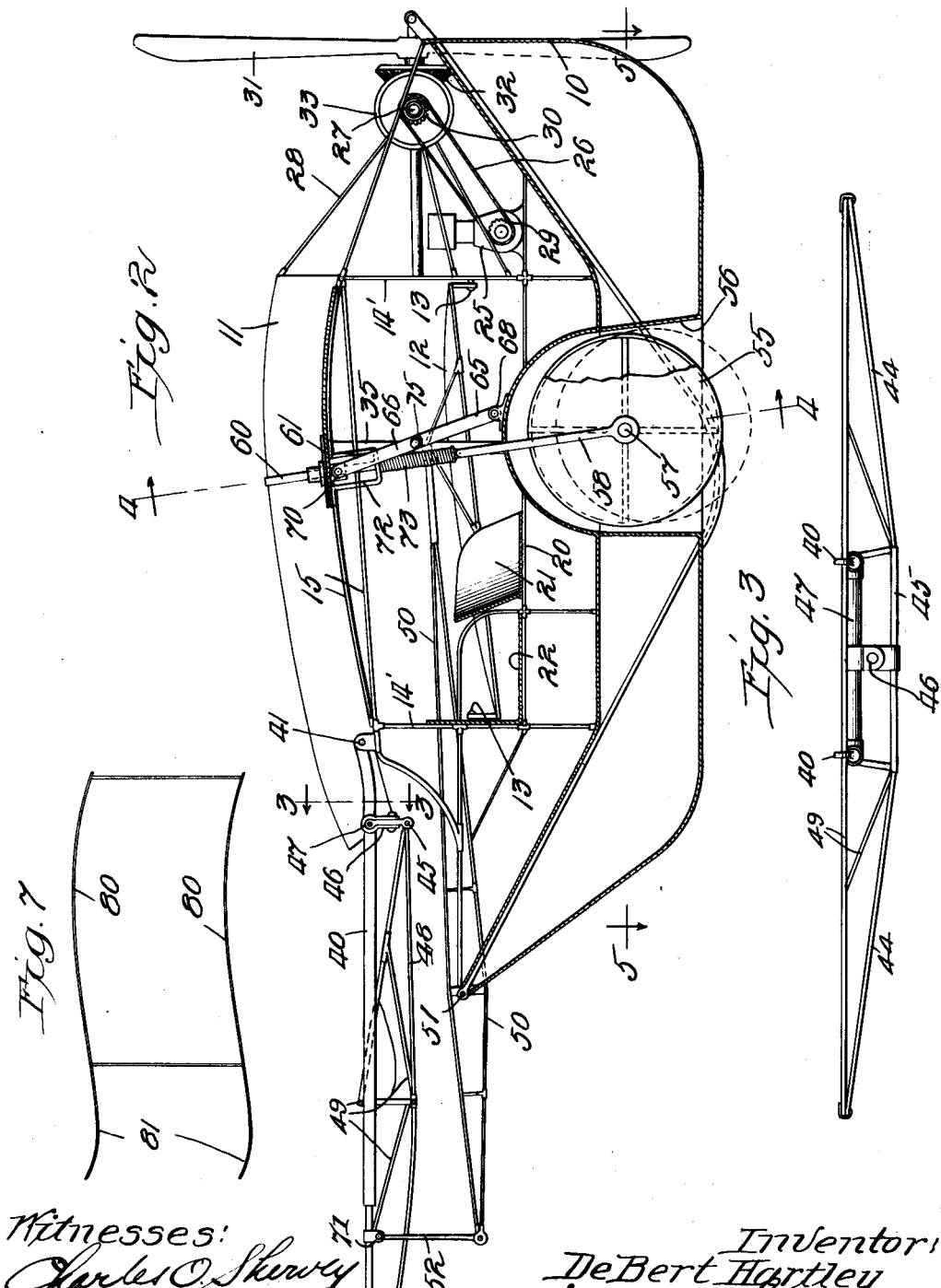

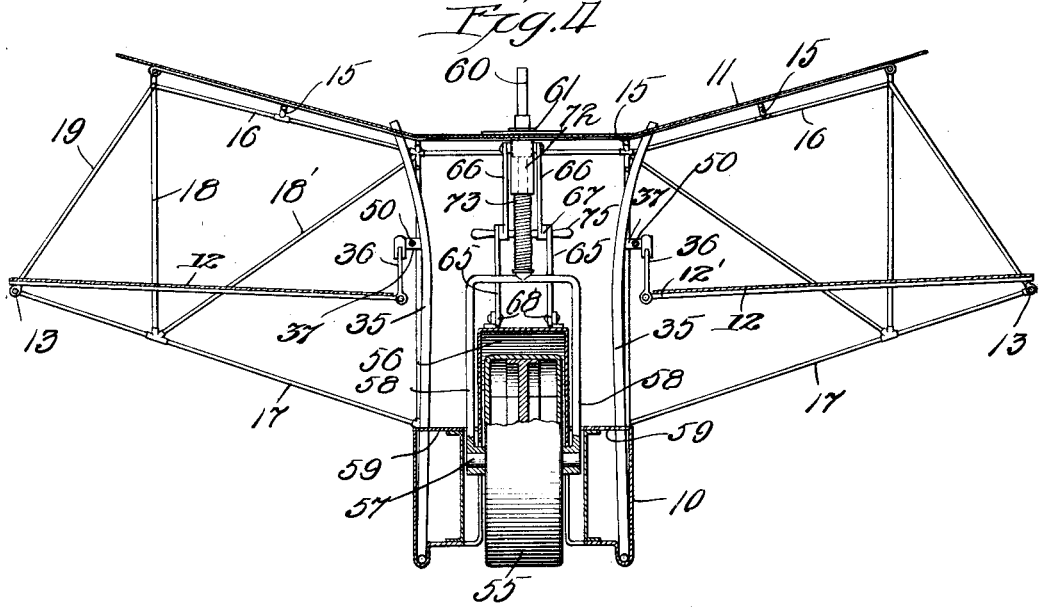
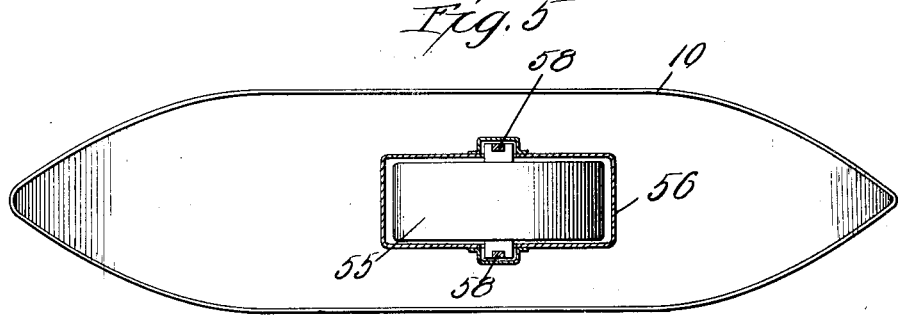
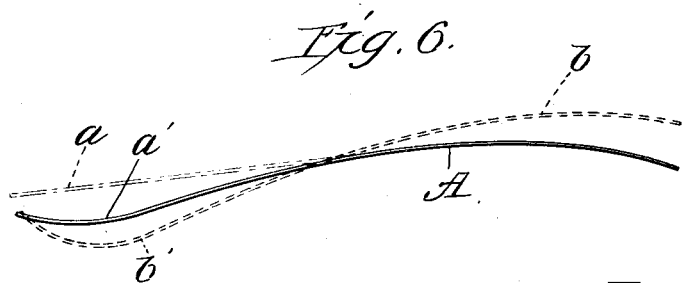

DE BERT HARTLEY, OF CHICAGO, ILLINOIS.

FLYING-MACHINE.

1,123,737. Specification of Letters Patent. Patented Jan. 5, 1915.

Application filed September 16, 1912. Serial No. 720,496.

*To all whom it may concern:*

Be it known that I, DE BERT HARTLEY, a citizen of the United States, and a resident of Chicago, in the county of Cook and State of Illinois, have invented certain new and useful Improvements in Flying-Machines; and I do hereby declare that the following is a full, clear, and exact description thereof, reference being had to the accompanying drawings, and to the characters of reference marked thereon, which form a part of this specification.

This invention relates to that type of heavier-than-air flying machines known as aeroplanes, wherein the weight of the machine and the load is sustained by the reactions resulting in moving the aeroplane edgewise through the air at a small angle of incidence by a mechanical power or other dynamic force.

Among the objects of the invention is to provide in an aeroplane a supporting plane or member which embodies a supporting surface for sustaining the machine in the air and a flexing portion which is acted upon by reactions of the air against the member so as to constitute a propelling factor to assist in propelling the machine forwardly and so as to thereby enable the machine to sustain itself in the air in soaring flight upon the failure of the power, and to assist the motor in propelling the machine, thereby materially reducing the motor power required to operate the machine. In accordance with this feature of my invention I propose to construct the supporting plane or member with rigid or substantially rigid supporting or sustaining portion at the front or leading edge and with a flexible portion extending from an intermediate part of the plane to the trailing edge thereof, said flexible edge or portion being sensitively flexible at its extreme trailing edge of the frame and gradually decreasing in flexibility toward the supporting or sustaining portion of the plane. As a result of this construction, when the machine is sustained in the air by said plane or member the flexible trailing edge portion thereof is flexed or curved upwardly; curving first at the extreme and most flexible rear portion thereof and gradually decreasing in curvature toward the non-flexing or front portion of the plane or member. As the weight of the machine is thrown more on the flexible margin of the plane, as for instance, when the plane is tilted upwardly at its leading margin to increase its angle of incidence, the curvature of the flexing margin thereof is increased, with the result of adding to the propelling function of the flexible portion of the plane so as to increase the propelling action when the machine is under power, or to maintain the machine in soaring flight for a considerable time upon release or failure of power. This upward curvature of the rear flexing portion of the plane also has the effect to give an upward tendency to the machine in flight. This feature of the invention may be applied to the main supporting plane or planes of the machine and also applied to other planes, as the following plane or rudder, and may be applied to biplanes, monoplanes or other types of machines.

Another object of the invention is to provide a machine having an improved pontoon or boat shaped body as will enable it to alight safely on the water and to rise from the water.

A still further object of the invention is to provide an improved construction of rudder or following plane arranged to permit the same being tilted sidewise and swung vertically.

These and other objects of the invention will appear from the following description of the invention and the invention consists in the construction and arrangement of the parts hereinafter described and more particularly pointed out in the appended claims.

In the drawings:—Figure 1 is a plan view of a flying machine embodying my invention. Fig. 2 is a view partially in side elevation and partially in section thereof. Fig. 3 is a vertical section on the line 3—3 of Fig. 2. Fig. 4 is a transverse section on the line 4—4 of Fig. 2. Fig. 5 is a horizontal section on the line 5—5 of Fig. 2. Fig. 6 is a diagram illustrating the combined supporting and flexing plane in different positions which it assumes. Fig. 7 illustrates the adaptation of my plane improvements to a biplane type of machine.

In the drawings, 10 designates the boat shaped frame or body of the machine, the horizontal section of which is shown in Fig. 5.

11 designates what may be termed the central or body plane of the machine.

12, 12 designate lateral or oppositely extending planes or wings which are pivoted near their inner ends to the machine frame on the pivots 13, with the pivots trending in the line of flight.

14 designates a horizontal following plane or rudder that is hinged to the machine frame at the trailing edge of the main plane to swing vertically, and also arranged to be twisted or warped sidewise.

The frame of the machine may be closed, or of open work construction, the latter as herein shown. It comprises front and rear trusses, designated as a whole by 14', 14', which are connected at their lower sides by the body 10 and at the upper sides by the frame bars 15, which latter support the main or central plane 11. The arrangement of the trusses may be any preferred construction, the front truss being shown in Fig. 4, with the upper and lower truss bars 16, 17, respectively, connected by the struts and braces 18, 18' and 19. The pivots 13 for the lateral planes are located at the juncture of the lower truss members 17 and the braces 19. The central plane is dihedrally angled, as most clearly shown in Figs. 2 and 4. The frame carries above the pontoon like body 10 a support 20 for the seat 21 for the aviator and may be provided in rear of said seat with a space 22 for passengers.

25 designates a motor which is mounted on the support 20 and is connected by a sprocket chain or belt 26 with a shaft 27 that is mounted in forwardly extending members 28 of the machine frame; said belt being trained about a sprocket wheel 29 on the engine shaft and a sprocket wheel 30 on the shaft 27.

31, 31 designate propellers rotatively mounted in any suitable manner on the frame 28 and adapted to rotate in opposite directions. Said propellers are driven from the shaft 27 by intermeshing miter gears 32, 33 on the propeller shafts and at the ends of the shaft 27, respectively. This construction and arrangement provides a direct and extremely simple and light method of driving the propellers in opposite directions, thereby avoiding the use of crossed belts or chains. While I have shown the propellers located in front of the machine, it is clear that this feature of my invention may be applied to machines where the propellers are located in rear thereof, or otherwise.

The laterally extending planes or wings 12 are herein shown as connected at their inner ends 12', inwardly beyond their pivots 13 to upright guide bars 35, 35, constituting part of the main frame, in the same general manner as shown in my prior U. S. Letters Patent, No. 1,068,651. The details of such construction need not be further referred to except to state that the connections 36 37 at the inner ends of said planes are placed under the action of carrying springs, contained within the hollow guide bars 35, such as described in my said prior U. S. Letters Patent, in such manner that the planes may yield upwardly relatively to the main plane against the action of said springs, and are restored to normal positions by said springs to automatically maintain the machine in equilibrium. The plane 12 may also be manually actuated by grasping the inner ends thereof.

The rudder or following plane 14 embraces two centrally arranged, laterally separated and rearwardly directed members 40, 40 which are hinged, to swing vertically, at their forward ends at 41 to the upper truss member of the rear truss of the main frame. They are fixedly connected at their rear ends to the frame member 42 of the rudder frame, and said frame member 42 is continued laterally from the rear ends of the members 40 and then forwardly to constitute the side and forward members 43, 44, respectively, of the rudder frame, the members 44 being brought together near the forward ends of the hinged members 40 and connected by a cross bar 45 (Figs. 2 and 3). Said cross bar 45 is pivotally connected by a link 46 to a cross bar 47 that extends between and connects the forward ends of the hinged members 40.

48, 48 designate frame members which are arranged beneath the hinged members 40 and extend from the front cross member 45 to, and are attached to the rear member 42, and they are also connected to the boundary members 42, 43 and 44 by lateral and oblique braces 49, 49. The parts 42, 43, 44, 45, 48 and 49 constitute a frame to which the rear ends of the hinged members are fixed and which is loosely or swingingly connected to the front ends of the hinged members through the cross bar 47 and link 46. The completed frame is covered or inclosed by a fabric which constitutes the sustaining and steering or air resisting factor of the rudder.

The rudder is swung vertically on its hinges 41 by means of levers 50 which are hinged at 51 (Fig. 2) to rearward extensions of the main frame in much the same general manner as in the construction shown in my aforesaid Letters Patent. Said levers are connected at their rear ends by links 52 to the hinged members 40 of the rudder and extend forwardly beneath the main plane where they may be connected to the connections 36 between the lateral planes and the guides 35. When the forward ends of both levers 50 are depressed equally the rudder 14 is swung vertically throughout its width. By reason of the pivotal connection of the cross bar 47 with the cross bar 45, and of the flexibility of the members of the rudder frame when one of said levers 50 is depressed to a greater extent than the other, the rudder is warped or twisted sidewise to give it a steering function to steer the machine laterally. The flexibility of the rudder frame is such that lateral twisting or tilting of the rudder may be carried beyond the effect due to the pivotal connection of the hinged members of the rudder with the lower rudder frame for steering purposes.

55 designates a starting and alighting wheel that is contained in a downwardly opening casing or well 56 in the bottom of the boat like body 10. Said wheel is mounted on an axle 57 that is carried by the lower ends of the fork arms 58, 58 which extend upwardly through the walls 59 at the sides of the casing 56 and terminate in a stem 60 which, as herein shown, extends through and slides in a guide plate 61 fixed to the central part of the main or central plane.
The wheel mounting, comprising the yoke 58 and stem 60 are normally held upwardly to raise the wheel 55 into the casing or well 56 by means of toggle arms 65, 66 hinged to each other at their adjacent ends. The lower toggle arms 65 are hinged at their lower ends to lugs 68 carried by the top of the casing 56 and the upper toggle arms are hinged at their upper ends to lugs carried by the collar 70 that is attached to the stem 60 beneath the main plane. Surrounding the stem 60 and interposed between the closed or transverse member of the wheel carrying fork and a bracket 72 attached to and depending from the main plane is a spiral, expansively acting spring 73 which has a tendency to press the wheel into its lowermost position, indicated in dotted lines. The said toggle arms are provided at their centrally hinged portions with hand pieces 75 by which they may be operated to depress and raise the wheel.

When the toggle arms are straightened, as shown in full lines in Fig. 2, the wheel 55 is drawn upwardly into the well or compartment of the boat body. The toggle arms pass at their inner hinged ends beyond a plane passed through their outer hinges so as to thereby lock the parts in position to hold the wheel upwardly. When the toggle arms are broken forwardly, the spring 73 holds the wheel in its lowermost position to first strike the ground in alighting and to aid in sustaining the machine when resting on the ground. The spring serves also as a shock absorber when the wheel is down and when the machine alights.

As a further improvement the said starting and alighting wheel 55 is made with a broad tread so as to constitute a stable support for the machine when alighting and starting and when the machine is resting on the ground. It is made hollow, as indicated in Fig. 2, so as to thereby give buoyancy to the machine in the water and to float or assist in floating the machine on water.

The main side and following planes are, in practice, covered on their upper and lower sides by a suitable fabric in the usual manner to constitute the required supporting or sustaining surfaces of the planes. The forward portions of the planes thus constructed are made rigid or substantially so, so as to constitute sustaining surfaces to support the machine in flight; and in the type of machine herein shown no flexibility is required in the forward portions of the planes. In types of aeroplanes wherein the flight is directed by slightly warping the planes, or certain of them, in the machine, said forward or advance portions of the planes will, of course, possess the required flexibility for such warping action.

In accordance with my invention the trailing or rear portions of the planes are constructed to possess considerable flexibility, said trailing portions being most flexible at their extreme rear margins and gradually decreasing in flexibility toward the inflexible, or substantially inflexible, portions of the planes. I have herein shown, and will now describe, a construction which I have employed for producing the flexible or trailing portions of the planes and which I have found in practice efficient for the purposes herein set forth. In accordance with the illustrated embodiment of this feature of my invention, the frame of the trailing portion of the plane is composed principally of flexible sheet plates, preferably sheet steel, which are designated in the several planes as a whole by 70'. In the rudder these flexible plates extend from side to side thereof. In the lateral plane 12 they extend from the extreme outer ends thereof to points near the central or main plane 11. In the main or central plane 11 they may extend from the lateral edges of said plane to points short of the center thereof, when the main plane is constructed as herein shown. The transversely central or intermediate portions of said plates may be solid, and the plates 70' are attached in any suitable manner to frame members 71', 72' and 73' of the rudder, the lateral plane and main plane frames, respectively. As herein shown, the inner or forward margins of the plates 70' are serrated to form tongues 75 that are bent over the said members 71', 72' and 73', which constitute parts of their respective planes; or they may be clamped or bolted to the frame members if preferred.

In order to render the extreme trailing margins of the planes sensitively flexible and to decrease the flexible quality thereof toward the solid portions of the plates, the said trailing margins of the plates are cut away to provide rearwardly tapering tongues 76, the outer or rear ends of which converge to points, as most clearly shown in Fig. 1. By thus cutting the plates to form said tongues, the extreme rear edges thereof are made extremely flexible and, inasmuch as the tongues increase in width from the rear to the forward ends thereof, the flexibility of the plates is gradually decreased toward the intermediate or solid portions of the plates. Preferably each of tne frames of the planes thus equipped is provided above the solid portion of the plates with downholding members which prevent the plates, as a whole, from flexing upwardly, and which constitute lines which mark or limit the flexion of the plates. The plates associated with the main plane may be thus located beneath the upper truss member 16 of the main frame, while the rudder and lateral planes may be provided with separately applied members 48, 480, which also constitute parts of the frame members of said planes.

While the construction described constitutes a convenient means for giving the desired flexure to the trailing edges of the planes, it will be understood that my invention, in its broadest phase, is not so limited.

The action of each of the planes shown in the illustrated machine, with respect to its forward substantially inflexible sustaining surface and its trailing flexible parts is the same, and in the following description of the action of the plane thus constructed but a single plane is referred to. The said flexible trailing portion of the plane A when at rest is preferably straight or nearly so, as indicated at $a$ in Fig. 6. When the machine is in flight it is supported mainly by the relatively inflexible forward or advance portion thereof. The weight of the machine transmitted to the body of air beneath the plane through the rear flexible trailing marginal portion thereof causes the said flexible margin to further curve upwardly in the manner shown at $a'$ in Fig. 6. A comparison of the positions $a$ and $a'$ indicates the added flexure or curvature given to the trailing portion of the plane when the machine is supported in the air in a straight or substantially straight flight. In said Fig. 6 the full line $a$ indicates the cross section of the plane when the machine is supported in the air in straight flight, while the dotted rear portion $a$ taken with the full line forward portion indicates the cross section of the plane when the machine is at rest. I have demonstrated in practice that this upward curvature of the flexible trailing portion of the plane gives a pronounced forward propelling impetus to the plane and the machine carrying the same, in the same manner that the curvature of the tips of the wings of a bird gives forward propelling impetus to the bird in flight, or as the flex of the tail of a fish is used to push the fish through the water. I have demonstrated that a plane so constructed and suspended in the air and not under the influence of an external propelling force, as a motor, has a tendency to proceed forwardly in a substantially straight course to give soaring effect to the plane when under the influence of momentum previously imparted thereto, either by a motor or by gravity or by a slight dipping of the plane in flight without a motor. The propelling effect, due to the curvature of the flexible portion of the plane, not only carries the plane forwardly, but has the further tendency to cause the plane to slightly rise from a straight line of flight.

From the foregoing it follows that the propelling effect due to the flexible curved rear portion of the plane materially assists the motor, when the machine is in flight under power, so that I am thereby enabled to decrease the capacity of the motor relative to the weight of the machine.

If the plane is tilted upwardly at its advance edge at greater than a normal angle of incidence, as shown by the dotted lines $b$, $b'$ in Fig. 6, the flexible trailing part of the plane will take on a greater curvature, as at $b$, and thereby to a greater extent assist the propelling factor in advancing the machine, or to overcome or neutralize backward skidding thereof. This curvature of the flexible trailing portion at a time when the plane is tilted upwardly beyond its normal angle of incidence, has the effect to prevent the machine from skidding downwardly even when the angle of tilting is beyond what is usually considered a safe angle, as will be apparent from the dotted lines $b$, $b'$ in said Fig. 6. In practice, I have found that a satisfactory proportion of the sustaining and flexing portions of the plane to be substantially one-third to one-half of the flexible portion, although this proportion may be considerably varied and may require such variation in adapting this feature of my invention to different types of machines. In order that all the flexible tongues of the trailing margin of the plane may act together, I prefer to connect the rear pointed ends of the tongues, as by the connecting members 90, as shown in Fig. 1. I have shown this feature of my invention in Fig. 7 as applied to a biplane type of machine. In the application of my invention to a biplane, the usual proportions of the sustaining width of the planes 80 may not be disturbed, but the flexible trailing portions 81 applied thereto, as shown in Fig. 7, may be extended beyond the usual trailing margins of the substantially inflexible planes 80 of the machine.

I claim as my invention:—

1. In an aeroplane flying machine, a plane comprising a frame provided at its trailing portion with a spring plate formed at its rear edge with rearwardly tapering tongues which decrease in flexibility from their extreme rear ends forwardly and a plane sustaining fabric covering and inclosing said tongues.

2. In an aeroplane flying machine, a plane comprising a frame provided at its trailing portion with a spring plate formed at its rear edge with rearwardly tapered tongues, and means extending along and connecting the pointed ends of the tongues.

3. In an aeroplane flying machine, a plane comprising a skeleton frame which includes at its trailing portion, a flexible resilient member which is made most flexible at its extreme trailing margin and decreases in flexibility toward the center of the plane, a down holding member embodied in and rigid with the frame above said resilient member at the least flexible portion of the latter, and a plane sustaining fabric covering and inclosing said frame and flexible trailing member.

4. In an aeroplane flying machine, a plane comprising a skeleton frame provided at its trailing margin with a spring plate formed at its rear edge with rearwardly tapered tongues most flexible at their rear ends, said frame including a down holding member which bears on the plate at the bases of said tongues and a plane sustaining fabric enveloping said frame and plate.

5. In an aeroplane flying machine, a plane member consisting of a skeleton frame, with a sustaining fabric enveloping the same, said frame being of fixed construction at its entering margin and a flexible, resilient member constituting the trailing margin of said plane, the rear margin of which resilient member is composed of rearwardly tapered tongues connected together at their points.

6. In an aeroplane flying machine, a plane member consisting of a skeleton frame with a sustaining fabric enveloping the same, said frame, being of fixed construction at its entering margin and a flexible, resilient member constituting the trailing margin of said plane, the rear margin of which resilient member is composed of rearwardly tapered tongues connected together at their points, one of the fixed members of the frame overlying said resilient member at the bases of the tongues thereof and between the front and rear margins of said member to constitute a down holding element about which the trailing edge of the resilient member curves.

7. In an aeroplane flying machine, a plane comprising a rigid main portion constituting the front and intermediate part of the plane and a resilient flexible trailing portion, the latter comprising a resilient member attached at its front margin to a fixed part of the frame and made sensitively flexible at its trailing edge and gradually decreasing in flexibility toward its forward edge, and a fixed down holding member rigid with the main portion of the frame and overlying said flexible member at its least flexible portion and at a distance in rear of the front margin thereof.

8. In an aeroplane flying machine, the combination with a main plane and its frame, of a rudder arranged at the trailing edge of the main plane and comprising rearwardly extending bars hinged at their forward ends to the main frame, a frame fixedly connected at its rear edge to the rear ends of said bars and pivotally connected at its front end to the front end of said bars, and means for swinging the rudder vertically and for the tilting of the rudder relatively to the hinged bars.

9. In an aeroplane flying machine, the combination with a main plane and its frame, of a rudder arranged at the trailing edge of the main plane and comprising rearwardly extending bars hinged at their forward ends to the main frame, a frame fixedly connected at its rear edge to the rear ends of said bars and pivotally connected at its front end to the front end of said bars, and rudder actuating levers pivoted to the machine frame and connected at their rear ends to the rudder at laterally separated points and extending at their forward ends beneath the main plane.

10. In an aeroplane flying machine, a combined tilting and warping following plane having a trailing edge provided with a trailing marginal portion which is sensitively flexible at its rear edge and gradually decreases in flexibility forwardly and assumes a normally upwardly curved contour when the machine is in flight with its weight resting on the plane.

11. In an aeroplane flying machine, a combined tilting and warping following plane having a trailing edge provided with a trailing marginal portion which is sensitively flexible at its rear edge and gradually decreases in flexibility forwardly, said trailing flexible edge being slitted to constitute separate tongues, and a flexible fabric plane extending continuously over said tongues.

12. In an aeroplane flying machine, a frame, two oppositely extending planes hingedly connected to and extending laterally oppositely therefrom, with means to connect them to the frame to automatically maintain the lateral equilibrium of the machine, the trailing margins of the said planes comprising flexible portions which are made sensitively flexible at their extreme margins and decrease in flexibility forwardly, and an upper plane over and extending outwardly beyond the inner ends of said lateral planes and provided at its trailing edge with like flexible marginal portions.

13. In an aeroplane flying machine, a frame, two oppositely extending planes hingedly connected to and extending laterally oppositely therefrom, with means to connect them to the frame to automatically maintain the lateral equilibrium of the machine, the trailing margins of the said planes comprising flexible portions which are made most flexible at their extreme margins and decrease in flexibility forwardly, an upper plane over and extending outwardly beyond the inner ends of said lateral planes and provided at its trailing edge with like flexible marginal portions, and a horizontal rudder in rear of the upper plane having a like trailing margin.

In testimony, that I claim the foregoing as my invention I affix my signature in the presence of two witnesses, this 2nd day of August, A. D. 1912.

DE BERT HARTLEY.

Witnesses:
W. L. HALL,
HARRY S. GAITHER.